Feb. 14, 1967   G. P. BEIRISE   3,303,908
BRAKE SHOE CENTRALIZING DEVICE
Filed Dec. 29, 1964

INVENTOR.
GEORGE P. BEIRISE
BY Donald P. Selverki
HIS ATTORNEY

United States Patent Office 3,303,908
Patented Feb. 14, 1967

3,303,908
BRAKE SHOE CENTRALIZING DEVICE
George P. Beirise, Dayton, Ohio, assignor to General Motors Corporation, Detroit, Mich., a corporation of Delaware
Filed Dec. 29, 1964, Ser. No. 421,888
5 Claims. (Cl. 188—79.5)

This invention relates to vehicle braking systems and more particularly to a device for centering brake shoes after a brake actuation.

Braking systems of common design have return springs drawing one portion of brake shoes toward an anchor pin. The opposite end of the brake shoes from the anchor pin is usually free floating and is designed to follow the opposite end of the brake shoes to a centered position after a brake actuation. However, many circumstances can occur after prolonged use of braking mechanism which cause the brake shoes to be uncentered at a portion opposite from the anchor pin.

It is an object of the present invention to provide improved braking mechanism which centers a pair of brake shoes relative to a backing plate after a brake actuation.

It is another object of the present invention to provide an improved brake shoe centering device which maintains a brake shoe at a predetermined distance away from a vehicle drum regardless of the wear experienced on the brake lining.

It is still another object of the present invention to provide an improved brake shoe centering device which utilizes a friction joint to compensate for brake lining wear, thereby returning a brake shoe to a centered position relative to the backing plate while maintaining a predetermined clearance between the brake lining and the brake drum throughout the useful life of the lining.

Further objects and advantages of the present invention will be apparent from the following description, reference being had to the accompanying drawings wherein a preferred embodiment of the present invention is clearly shown.

Figure 1:
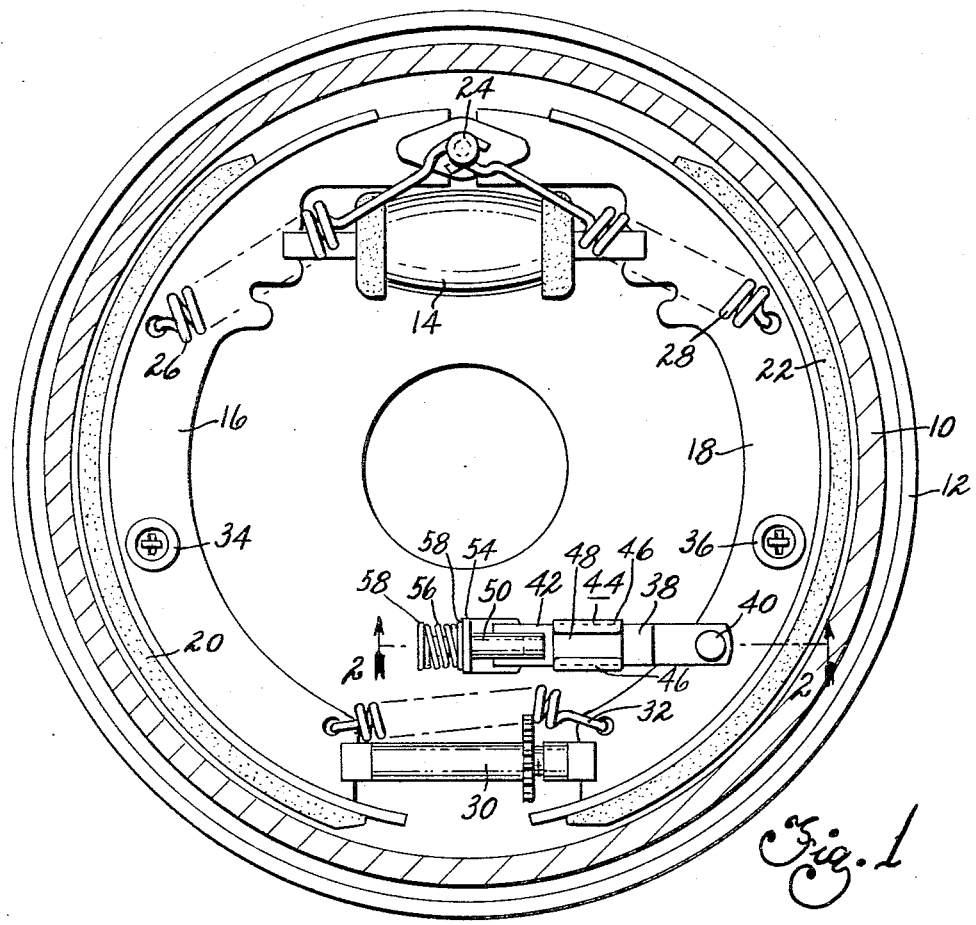
FIGURE 1 is an elevational view of a typical vehicle brake, the invention shown in its operative environment.

Referring to FIGURE 1, a brake drum 10 rotates with a vehicle wheel and moves relative to a fixed backing plate 12. A wheel cylinder 14, carried by the backing plate 12, is supplied hydraulic pressure in a typical manner and engages a primary brake shoe 16 and a secondary brake shoe 18. The hydraulic cylinder 14 is responsive to a build-up of pressure to drive the brake shoes 16 and 18 toward the drum 10 until linings 20 and 22, carried by the shoes 16 and 18, respectively, frictionally engage the rotating drum 10 to provide a braking action. An anchor pin 24 is carried by the backing plate 12 and provides a stop for the brake shoes 16 and 18 in a centered position relative to the backing plate 12 due to the urging of return springs 26 and 28 engaging the anchor pin 24 and the shoes 16 and 18.

The opposite ends of the brake shoes 16 and 18 are drawn toward an adjusting mechanism 30 by the urging of a spring 32. Hold-down springs 34 and 36 yieldably retain the brake shoes 16 and 18 against the backing plate 12. It is noted that the hold-down springs 34 and 36 provide a biasing force to hold the shoes 16 and 18 positively against the backing plate 12 and only generally serve to center the lower portions of the brake shoes 16 and 18 after a brake actuation.

A link portion 38 is pivotally connected to the secondary brake shoe 18 by means of pivot pin 40. The portion 42 and the link portion 38 are kept in sliding engagement by friction means 44.

Figure 2:
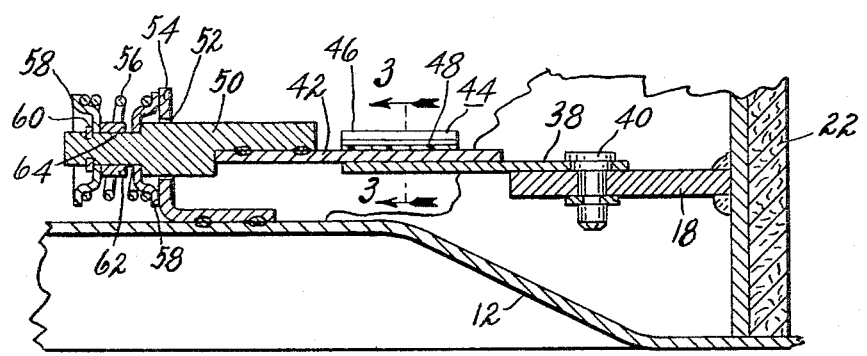
FIGURE 2 is a sectional view of the subject invention taken along line 2—2 of FIGURE 1.
Figure 3:
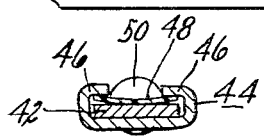
FIGURE 3 is a sectional view of the friction joint of the subject invention taken along line 3—3 of FIGURE 2.

Referring to FIGURE 2, the friction means 44 is comprised of cooperating, rolled-over flanges 46 wrapped around the portion 42 with a resilient member 48 compressed between the portion 42 of the rolled-over flanges 46. This arrangement of parts is best seen in FIGURE 3. The portion 42 is attached to a slide element 50, preferably by being welded thereto. It is understood that the element 50 and the portion 42 could be integrally formed or could be attached to one another by any well-known connecting means. Slide element 50 is adapted to slide in an aperture 52 formed in an upturned flange 54 firmly engaging the backing plate 12. A spring 56 is operatively positioned by spring retainers 58 that are held between the upturned flange 54 and a holding ring 60. A sleeve 62 is slidably disposed on a diameter 64 of the slide element 50 and is disposed between opposed portions of the spring retainers 58. It is noted that the sleeve 62 is shorter than the space between the retainers 58, and this extra distance represents the amount of desired clearance allowed the lining 22 from the drum 10. It should be noted that the link portion 38, the portion 42 and the slide element 50 are herein referred to as the link means or the link element. The back-turned flanges 46 and the resilient element 48 are referred to herein as the friction means and is generally designated by the numeral 44. The spring 56, retainers 58 and the sleeve 62 are referred to herein as the biasing means.

In operation, the shoes 16 and 18 are arranged to carry the linings 20 and 22 into frictional engagement with the drum 10 in response to a pressure build-up in cylinder 14. Referring to FIGURE 2, it is seen that movement of the brake shoe 18 and the lining 22 toward the drum 10 results in the link element following the movement of the shoe 18. Normally, the amount of movement allowed the lining 22 before engaging the drum 10 will be equal to the movement allowed the sleeve 62 on the diameter 64. When this movement occurs, the spring 56 is compressed between the retainers 58 and, therefore, will draw the brake shoe 18 away from the drum 10 when the pressure is relieved in the cylinder 14. The amount of return movement is always limited by the designed amount of movement allowed the sleeve 62. Therefore, under normal operating conditions, the brake shoe 18 will be drawn away from the drum 10 and, due to the engagement with the shoe 16 through the adjusting means 30, the shoe 16 will be indirectly repositioned a proportionate distance from the drum 10. As brake lining wear occurs on the linings 20 or 22, the amount of actuating movement necessary to bring the linings 20 and 22 into frictional engagement with the drum 10 will increase.

Referring to FIGURE 2, the amount of movement allowed the sleeve 62 on the diameter 64 is determined by design considerations and is inflexible beyond predetermined limits set therein. When excessive movement of the shoe 18 is required during a braking action due to wear of lining 22, the link portion 38 will slide in its frictional engagement with the back-turned flanges 46 through the friction element 48. This relative movement of the link portion 38 continues until the lining 22 frictionally engages the drum 10. When pressure is relieved in the cylinder 14, the compressed spring 56 will expand, thereby drawing the slide element 50, portion 42, and the link portion 38 away from the drum 10. This will result in a centering of the brake shoe 18 due to its engagement with the link portion 38 with the pivot 40. It is understood that the frictional engagement of the portion 38 and flanges 46 through the friction element 48 is greater than the force of the spring 56. Therefore, the newly established position of the link portion 38 relative to the portion 42 will not be altered and a new poised position for the brake shoe 18 is thereby established. This adjusting movement of the brake shoe 18 through the friction means 44 will occur any time the distance the lining 22 must move to engage the drum 10 exceeds the amount of predetermined movement allowed the sleeve 62 on the diameter 64.

The utility of the subject invention in the environment of a braking system prevents the brake shoes from hanging up after a movement in a braking action when the brake linings are worn. In this manner, dragging of the shoes on the drum is prevented and noise, sometimes attending a brake shoe that hangs up, is prevented. In addition to the undesirable noise, a dragging brake shoe generates heat through friction. This heat can cause brake fade or brake pulls during braking which affect overall braking efficiency. It is obvious that a dragging brake is wearing and, therefore, is undesirable for the reason of excessive wear generated.

It is likewise obvious that the brake centering device described herein positions the shoe 18 which is the secondary shoe in the illustration given, but only indirectly affects the positioning of the shoe 16 which is the primary shoe in the illustration. The shoe 16 can be properly positioned relative to the drum 10 by the adjusting means 30 or another shoe centering mechanism similar to the one described can be added to automatically position the shoe 16. The movement of the brake shoes during a servo action is compensated for by the pivotal mounting of the portion 38 at the pivot 40 as well as by the size of the aperture 52 which is preferably slightly larger than the slide element 50 allowing a cocking thereof in the aperture 52.

While the embodiment of the present invention, as herein disclosed, constitutes a preferred form, it is to be understood that other forms might be adopted.

What is claimed is as follows:

1. A brake shoe centering device for returning a brake shoe to a poised position away from a brake drum after a brake actuation, said device comprising: a link element including a first portion pivotally attached to the brake shoe and slidably carried by a relatively fixed member; biasing means engaging the relatively fixed member and said link element and arranged to permit a certain predetermined movement therebetween equal to the desired clearance of the brake shoe from the brake drum; and friction means establishing a variable engagement between said first portion of said link element and said relatively fixed member whereby a desired clearance established by said biasing means can be maintained between the brake shoe and the brake drum as wear occurs on a brake lining carried by the brake shoe.

2. The brake shoe centering device according to claim 1 wherein the relatively fixed member is the backing plate for the vehicle brake and said link element is slidably carried by an upturned flange formed as a portion of the backing plate.

3. The brake shoe centering device according to claim 1 wherein the biasing means is a spring carried on one end of said link element and a sleeve slidably disposed on a periphery of one end of said link element arranged to limit the compression of the spring after being compressed during a brake actuation a distance equal to the existing clearance between the brake lining and brake drum.

4. A brake shoe centering device for returning a brake shoe and brake lining to a poised position at a predetermined distance from a brake drum, said centering device comprising: a fixed member extending from a backing plate, said fixed member having an aperture therethrough; a link element having two complementary portions, a first of said portions pivotally engaging the brake shoe and a second of said portions slidably disposed through said aperture in the fixed member; biasing means including a spring, spring retainers for containing said spring, and a sleeve slidably disposed on the second portion of the link element and situated between the spring retainers to limit the compression of the spring disposed therearound, said spring retainers being contained between the fixed member and the second portion of said link element thereby controlling movement of the link element relative to the fixed member; and friction means disposed around opposed ends of the first and second portions of said link element yieldably establishing a relationship therebetween that is proportional to the amount of movement made by the brake shoe during a brake actuation and the controlled movement of the link element allowed by the sleeve of the biasing means.

5. The brake shoe centering device according to claim 4 wherein the controlled movement of the second portion of the link element is equal to the desired clearance between the brake shoe and the brake drum, said desired clearance being maintained as brake lining wears by a slipping of the friction means establishing thereby a new relationship between the first and second portions of the link element.

References Cited by the Examiner

UNITED STATES PATENTS

| 2,160,055 | 5/1939 | Brace | 188—79.5 |
| 2,196,799 | 4/1940 | Keplinger | 188—79.5 |
| 2,596,380 | 5/1952 | Dodge | 188—79.5 |

FOREIGN PATENTS

| 454,625 | 1/1928 | Germany. |

DUANE A. REGER, *Primary Examiner.*